United States Patent
Nichols et al.

(10) Patent No.: US 9,442,500 B2
(45) Date of Patent: Sep. 13, 2016

(54) SYSTEMS AND METHODS FOR ASSOCIATING WIRELESS DEVICES OF AN HVAC SYSTEM

(75) Inventors: Steve C. Nichols, Maple Grove, MN (US); Cary Leen, Hammond, WI (US); Jeffrey Boll, Brooklyn Park, MN (US); Stan Zywicki, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1225 days.

(21) Appl. No.: 13/415,743

(22) Filed: Mar. 8, 2012

(65) Prior Publication Data

US 2013/0238142 A1    Sep. 12, 2013

(51) Int. Cl.
G01M 1/38 (2006.01)
G05D 23/19 (2006.01)
G05B 15/02 (2006.01)

(52) U.S. Cl.
CPC ........... *G05D 23/1934* (2013.01); *G05B 15/02* (2013.01); *G05B 2219/2614* (2013.01); *G05B 2219/2642* (2013.01)

(58) Field of Classification Search
CPC .............. G05D 23/1934; G05B 15/02; G05B 2219/2642; G05B 2219/2614
USPC .................................................. 700/276–278
See application file for complete search history.

(56) References Cited

U.S. PATENT DOCUMENTS

| 4,079,366 A | 3/1978 | Wong |
| 4,174,807 A | 11/1979 | Smith et al. |
| 4,206,872 A | 6/1980 | Levine |
| 4,224,615 A | 9/1980 | Penz |
| 4,264,034 A | 4/1981 | Hyltin et al. |
| 4,296,334 A | 10/1981 | Wong |
| 4,298,946 A | 11/1981 | Hartsell et al. |

(Continued)

FOREIGN PATENT DOCUMENTS

| DE | 3334117 | 4/1985 |
| EP | 0070414 | 1/1983 |

(Continued)

OTHER PUBLICATIONS

"Comfort™ Programmable Owner's Manual," Carrier Touch-N-Go™, 60 pages, 2010. Catalog No. 0M-TCPHP-4CA, Replaces: OM-TCPHP-3CA.

(Continued)

*Primary Examiner* — Kenneth M Lo
*Assistant Examiner* — Chad Rapp
(74) *Attorney, Agent, or Firm* — Seager, Tufte & Wickhem, LLP

(57) ABSTRACT

A building control network may have a first central device, a second central device and one or more peripheral devices. An illustrative method may include placing the second central device into an associate mode, and sending an associate command from a perimeter device to associate the perimeter device with the second central device. The associate command may be received by the first central device. The first central device may send one or more commands to the second central device, where the one or more commands may cause the second central device to be taken out of its associate mode and to reconfigure the second central device to a perimeter device. The first central device may then be put in an associate mode, and both the second central device and the perimeter device may be associated as perimeter devices with the first central device.

20 Claims, 10 Drawing Sheets

(56) References Cited

U.S. PATENT DOCUMENTS

| | | |
|---|---|---|
| 4,308,991 A | 1/1982 | Peinetti et al. |
| 4,332,352 A | 6/1982 | Jaeger |
| 4,337,822 A | 7/1982 | Hyltin et al. |
| 4,337,893 A | 7/1982 | Flanders et al. |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,503,471 A | 3/1985 | Hanajima et al. |
| 4,506,827 A | 3/1985 | Jamieson et al. |
| 4,556,169 A | 12/1985 | Zervos |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,717,333 A | 1/1988 | Carignan |
| 4,725,001 A | 2/1988 | Carney et al. |
| 4,837,731 A | 6/1989 | Levine et al. |
| 4,881,686 A | 11/1989 | Mehta |
| 4,918,439 A | 4/1990 | Wozniak et al. |
| 4,942,613 A | 7/1990 | Lynch |
| 4,948,040 A | 8/1990 | Kobayashi et al. |
| 4,969,508 A | 11/1990 | Tate et al. |
| 4,992,779 A | 2/1991 | Sugino et al. |
| 4,997,029 A | 3/1991 | Otsuka et al. |
| 5,005,365 A | 4/1991 | Lynch |
| 5,012,973 A | 5/1991 | Dick et al. |
| 5,036,698 A | 8/1991 | Conti |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,797 A | 2/1993 | Nielsen et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,272,477 A | 12/1993 | Tashima et al. |
| 5,329,991 A | 7/1994 | Metha et al. |
| 5,348,078 A | 9/1994 | Dushane et al. |
| 5,351,035 A | 9/1994 | Chrisco |
| 5,386,577 A | 1/1995 | Zenda |
| 5,390,206 A | 2/1995 | Rein et al. |
| 5,404,934 A | 4/1995 | Carlson et al. |
| 5,414,618 A | 5/1995 | Mock et al. |
| 5,429,649 A | 7/1995 | Robin |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitcuhashi |
| 5,544,036 A | 8/1996 | Brown, Jr. et al. |
| 5,566,879 A | 10/1996 | Longtin |
| 5,570,837 A | 11/1996 | Brown et al. |
| 5,590,831 A | 1/1997 | Manson et al. |
| 5,603,451 A | 2/1997 | Helander et al. |
| 5,654,813 A | 8/1997 | Whitworth |
| 5,668,535 A | 9/1997 | Hendrix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,711,785 A | 1/1998 | Maxwell |
| 5,732,691 A | 3/1998 | Maiello et al. |
| 5,761,083 A | 6/1998 | Brown, Jr. et al. |
| 5,782,296 A | 7/1998 | Metha |
| 5,810,908 A | 9/1998 | Gray et al. |
| 5,818,428 A | 10/1998 | Eisenbrandt et al. |
| 5,833,134 A | 11/1998 | Ho et al. |
| 5,839,654 A | 11/1998 | Weber |
| 5,840,094 A | 11/1998 | Osendorf et al. |
| 5,862,737 A | 1/1999 | Chiu et al. |
| 5,873,519 A | 2/1999 | Beilfuss |
| 5,886,697 A | 3/1999 | Naughton et al. |
| 5,901,183 A | 5/1999 | D'Souza |
| 5,902,183 A | 5/1999 | D'Souza |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,917,416 A | 6/1999 | Read |
| D413,328 S | 8/1999 | Kazama |
| 5,937,942 A | 8/1999 | Bias et al. |
| 5,947,372 A | 9/1999 | Tiernan |
| 5,950,709 A | 9/1999 | Krueger et al. |
| 6,009,355 A | 12/1999 | Obradovich et al. |
| 6,013,121 A | 1/2000 | Chin et al. |
| 6,020,881 A | 2/2000 | Naughton et al. |
| 6,032,867 A | 3/2000 | Dushane et al. |
| D422,594 S | 4/2000 | Henderson et al. |
| 6,059,195 A | 5/2000 | Adams et al. |
| 6,081,197 A | 6/2000 | Garrick et al. |
| 6,084,523 A | 7/2000 | Gelnovatch et al. |
| 6,101,824 A | 8/2000 | Meyer et al. |
| 6,104,963 A | 8/2000 | Cebasek et al. |
| 6,119,125 A | 9/2000 | Gloudeman et al. |
| 6,121,875 A | 9/2000 | Hamm et al. |
| 6,140,987 A | 10/2000 | Stein et al. |
| 6,141,595 A | 10/2000 | Gloudeman et al. |
| 6,145,751 A | 11/2000 | Ahmed et al. |
| 6,149,065 A | 11/2000 | White et al. |
| 6,152,375 A | 11/2000 | Robison |
| 6,154,681 A | 11/2000 | Drees et al. |
| 6,167,316 A | 12/2000 | Gloudeman et al. |
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,216,956 B1 | 4/2001 | Ehlers et al. |
| 6,236,326 B1 | 5/2001 | Murphy |
| 6,259,074 B1 | 7/2001 | Brunner et al. |
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,344,861 B1 | 2/2002 | Naughton et al. |
| 6,351,693 B1 | 2/2002 | Monie et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,770 B1 | 6/2003 | Rosen |
| 6,580,950 B1 | 6/2003 | Johnson et al. |
| 6,581,846 B1 | 6/2003 | Rosen |
| 6,587,739 B1 * | 7/2003 | Abrams ............... G05B 15/02 |

(56) References Cited

U.S. PATENT DOCUMENTS

| | | |
|---|---|---|
| 6,595,430 B1 | 7/2003 | Shah ............... 340/12.32 |
| 6,596,059 B1 | 7/2003 | Greist et al. |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |
| 6,663,010 B2 | 12/2003 | Chene et al. |
| 6,685,098 B2 | 2/2004 | Okano et al. |
| 6,726,112 B1 | 4/2004 | Ho |
| D492,282 S | 6/2004 | Lachello et al. |
| 6,783,079 B2 | 8/2004 | Carey et al. |
| 6,786,421 B2 | 9/2004 | Rosen |
| 6,789,739 B2 | 9/2004 | Rosen |
| 6,801,849 B2 | 10/2004 | Szukala et al. |
| 6,810,307 B1 | 10/2004 | Addy |
| 6,810,397 B1 | 10/2004 | Qian et al. |
| 6,824,069 B2 | 11/2004 | Rosen |
| 6,833,990 B2 | 12/2004 | LaCroix et al. |
| 6,842,721 B2 | 1/2005 | Kim et al. |
| 6,868,293 B1 | 3/2005 | Schurr et al. |
| D512,208 S | 12/2005 | Kubo et al. |
| 6,973,410 B2 | 12/2005 | Seigel |
| 7,001,495 B2 | 2/2006 | Essalik et al. |
| D520,989 S | 5/2006 | Miller |
| 7,050,026 B1 | 5/2006 | Rosen |
| 7,055,759 B2 | 6/2006 | Wacker et al. |
| 7,080,358 B2 | 7/2006 | Kuzmin |
| 7,083,109 B2 | 8/2006 | Pouchak |
| 7,083,189 B2 | 8/2006 | Ogata |
| 7,084,774 B2 | 8/2006 | Martinez |
| 7,089,088 B2 | 8/2006 | Terry et al. |
| 7,108,194 B1 | 9/2006 | Hankins, II |
| 7,130,720 B2 | 10/2006 | Fisher |
| D531,588 S | 11/2006 | Peh |
| D533,515 S | 12/2006 | Klein et al. |
| 7,146,253 B2 | 12/2006 | Hoog et al. |
| 7,152,806 B1 | 12/2006 | Rosen |
| 7,156,318 B1 | 1/2007 | Rosen |
| 7,163,156 B2 | 1/2007 | Kates |
| 7,188,002 B2 | 3/2007 | Chapman, Jr. et al. |
| D542,236 S | 5/2007 | Klein et al. |
| 7,212,887 B2 | 5/2007 | Shah et al |
| 7,222,800 B2 | 5/2007 | Wruck |
| 7,225,054 B2 | 5/2007 | Amundson et al. |
| 7,231,605 B1 | 6/2007 | Ramakesavan |
| 7,232,075 B1 | 6/2007 | Rosen |
| 7,240,289 B2 | 7/2007 | Naughton et al. |
| 7,261,762 B2 | 8/2007 | Kang et al. |
| 7,274,973 B2 | 9/2007 | Nichols et al. |
| 7,302,642 B2 | 11/2007 | Smith et al. |
| 7,331,187 B2 | 2/2008 | Kates |
| 7,341,201 B2 | 3/2008 | Stanimirovic |
| 7,354,005 B2 | 4/2008 | Carey et al. |
| RE40,437 E | 7/2008 | Rosen |
| 7,419,532 B2 | 9/2008 | Sellers et al. |
| 7,435,278 B2 | 10/2008 | Terlson |
| 7,451,606 B2 | 11/2008 | Harrod |
| 7,452,396 B2 | 11/2008 | Terlson et al. |
| 7,496,627 B2 | 2/2009 | Moorer et al. |
| 7,505,914 B2 | 3/2009 | McCall |
| 7,542,867 B2 | 6/2009 | Steger et al. |
| 7,556,207 B2 | 7/2009 | Mueller et al. |
| 7,594,960 B2 | 9/2009 | Johansson |
| 7,604,046 B2 | 10/2009 | Bergman et al. |
| 7,617,691 B2 | 11/2009 | Street et al. |
| 7,644,591 B2 | 1/2010 | Singh et al. |
| 7,665,019 B2 | 2/2010 | Jaeger |
| 7,676,282 B2 | 3/2010 | Bosley |
| 7,707,189 B2 | 4/2010 | Haselden et al. |
| 7,713,339 B2 | 5/2010 | Johansson |
| 7,739,282 B1 | 6/2010 | Smith et al. |
| 7,770,242 B2 | 8/2010 | Sell |
| 7,793,056 B2 | 9/2010 | Boggs et al. |
| 7,814,516 B2 | 10/2010 | Stecyk et al. |
| 7,865,252 B2 | 1/2011 | Clayton |
| 7,941,431 B2 | 5/2011 | Bluhm et al. |
| 7,952,485 B2 | 5/2011 | Schechter et al. |
| 7,957,775 B2 | 6/2011 | Allen, Jr. et al. |
| 7,984,220 B2 | 7/2011 | Gerard et al. |
| 8,032,254 B2 | 10/2011 | Amundson et al. |
| 8,087,593 B2 | 1/2012 | Leen |
| 8,091,796 B2 | 1/2012 | Amundson et al. |
| 8,167,216 B2 | 5/2012 | Schultz et al. |
| 8,239,066 B2 | 8/2012 | Jennings et al. |
| 8,280,556 B2 | 10/2012 | Besore et al. |
| 2001/0025349 A1 | 9/2001 | Sharood et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0060701 A1 | 5/2002 | Naughton et al. |
| 2002/0082746 A1 | 6/2002 | Schubring et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0171624 A1 | 11/2002 | Stecyk et al. |
| 2002/0173929 A1 | 11/2002 | Seigel |
| 2003/0000692 A1 | 1/2003 | Takaski et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0070544 A1 | 4/2003 | Mulvaney et al. |
| 2003/0074489 A1 | 4/2003 | Steger et al. |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennan |
| 2004/0074978 A1 | 4/2004 | Rosen |
| 2004/0133314 A1 | 7/2004 | Ehlers et al. |
| 2004/0193324 A1 | 9/2004 | Hoog et al. |
| 2004/0245352 A1 | 12/2004 | Smith |
| 2004/0262410 A1 | 12/2004 | Hull |
| 2005/0040250 A1* | 2/2005 | Wruck ............... 236/51 |
| 2005/0083168 A1 | 4/2005 | Beitenbach |
| 2005/0195757 A1* | 9/2005 | Kidder ............... H04W 60/00 370/278 |
| 2005/0270151 A1 | 12/2005 | Winick |
| 2006/0032379 A1 | 2/2006 | Kates |
| 2006/0071086 A1 | 4/2006 | Kates |
| 2006/0168342 A1 | 7/2006 | Budde et al. |
| 2006/0186213 A1 | 8/2006 | Carey et al. |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2007/0013534 A1 | 1/2007 | DiMaggio |
| 2007/0029397 A1 | 2/2007 | Mueller et al. |
| 2007/0045429 A1 | 3/2007 | Chapman, Jr. et al. |
| 2007/0114293 A1 | 5/2007 | Gugenheim |
| 2007/0114295 A1 | 5/2007 | Jenkins |
| 2007/0277061 A1 | 11/2007 | Ashe |
| 2007/0278320 A1 | 12/2007 | Lunacek et al. |
| 2007/0289731 A1 | 12/2007 | Deligiannis et al. |
| 2008/0015740 A1 | 1/2008 | Osann, Jr. |
| 2009/0140056 A1 | 6/2009 | Leen |
| 2009/0140057 A1* | 6/2009 | Leen ............... 236/49.3 |
| 2009/0140060 A1 | 6/2009 | Stoner et al. |
| 2009/0140062 A1 | 6/2009 | Amundson et al. |
| 2009/0143879 A1 | 6/2009 | Amundson et al. |
| 2009/0143880 A1 | 6/2009 | Amundsom et al. |
| 2009/0143916 A1 | 6/2009 | Boll et al. |
| 2009/0165644 A1 | 7/2009 | Campbell |
| 2009/0199212 A1 | 8/2009 | Schneider |
| 2010/0006660 A1* | 1/2010 | Leen ............... G05D 23/1931 236/51 |
| 2010/0008422 A1 | 1/2010 | Shimizu et al. |

(56) References Cited

U.S. PATENT DOCUMENTS

| | | |
|---|---|---|
| 2010/0084482 A1 | 4/2010 | Kennedy et al. |
| 2010/0107112 A1 | 4/2010 | Jennings et al. |
| 2010/0161574 A1 | 6/2010 | Davidson et al. |
| 2010/0197238 A1 | 8/2010 | Pathuri et al. |
| 2010/0204834 A1 | 8/2010 | Comerford et al. |
| 2011/0061527 A1 | 3/2011 | Sullivan |
| 2011/0078515 A1 | 3/2011 | Yasukawa |
| 2011/0093424 A1 | 4/2011 | Zimmermann et al. |
| 2011/0185895 A1 | 8/2011 | Freen |
| 2012/0318073 A1 | 12/2012 | Zavodny et al. |
| 2012/0318135 A1 | 12/2012 | Hoglund et al. |
| 2012/0318137 A1 | 12/2012 | Ragland et al. |
| 2012/0318138 A1 | 12/2012 | Bisson et al. |
| 2012/0319851 A1 | 12/2012 | Hoglund et al. |
| 2012/0323374 A1 | 12/2012 | Dean-Hendricks et al. |
| 2012/0323375 A1 | 12/2012 | Dean-Hendricks et al. |
| 2012/0323377 A1 | 12/2012 | Hoglund et al. |

FOREIGN PATENT DOCUMENTS

| | | | |
|---|---|---|---|
| EP | 0434926 | | 8/1995 |
| EP | 0678204 | | 3/2000 |
| EP | 0985994 | | 3/2000 |
| EP | 1033641 | | 9/2000 |
| EP | 1074009 | | 7/2001 |
| EP | 1143232 | | 10/2001 |
| EP | 2138919 | | 12/2009 |
| FR | 2711230 | | 4/1995 |
| WO | WO 97/11448 | | 3/1997 |
| WO | WO 97/39392 | | 10/1997 |
| WO | WO 00/43870 | | 7/2000 |
| WO | WO 01/52515 | | 7/2001 |
| WO | WO 01/79952 | | 10/2001 |
| WO | WO 02/23744 | | 3/2002 |
| WO | WO 2010/021700 | | 2/2010 |
| WO | WO2011/045719 | * | 4/2011 |

OTHER PUBLICATIONS

"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—Aug. 8, 200—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/hal01.htm, 3 pages, Apr. 1999.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"RCS X10 Thermostat Plug-In for Home Seer Beta Version," 25 pages, Downloaded Sep. 9, 2011. 2.0.105.
"Spotlight on integrated systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001; First Sale Feb. 2001.
AED Electronics, Inc., "Presenting Climatouch the Most Innovative Thermostat in the World!," 2 pages, prior to Nov. 30, 2007.
Andrews et al., "Clicky: User-Centric Input for Active Spaces," 17 pages, Aug. 2004.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
U.S. Appl. No. 13/434,778, filed Mar. 29, 2012.
U.S. Appl. No. 13/227,395, filed Sep. 11, 2011.
U.S. Appl. No. 13/325,300, filed Dec. 14, 2011.
U.S. Appl. No. 13/325,315, filed Dec. 14, 2011.
U.S. Appl. No. 13/325,503, filed Dec. 14, 2011.
U.S. Appl. No. 13/325,515, filed Dec. 14, 2011.
U.S. Appl. No. 13/325,525, filed Dec. 14, 2011.
U.S. Appl. No. 13/325,554, filed Dec. 14, 2011.
U.S. Appl. No. 13/325,617, filed Dec. 14, 2011.
U.S. Appl. No. 13/326,553, filed Dec. 15, 2011.
U.S. Appl. No. 13/420,120, filed Mar. 14, 2012.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.

(56) References Cited

OTHER PUBLICATIONS

DESA Heating Products, "Wireless Hand-Held Remote Control Sets Models (C) GHRCB and (C)GHRCTB, Operating Instructions," 4 pages, May 2003.
Domotique Secant Home Automation—Web Page, available at http://www.secant.ca/En/Company/Default.asp, 1 page, printed Sep. 28, 2004.
Emme Core User Guide, Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer Users Manual, 22 pages, Downloaded May 24, 2012. 11-99.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Harris et al., "Optimizing Memory Transactions," Microsoft Research Havard University, 12 pages, May 25, 2012.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor—Integrated R7044 and FS90 Ver. 2.0," Operator Manual, 70 pages, Apr. 1995.
Honeywell, "Installation Guide: Wireless Entry/Exit Remote," 12 pages, 2011.
Honeywell, Wireless Entry/Exit Remote, Operating Manual, 9 pages, 2011.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "RedLINK™ Wireless Comfort Systems," RedLINK Wireless Technology, 8 pages, Aug. 2011. 50-1194 PR.
Honeywell, "Total Connect Online Help Guide," Revision A, 800-02577-TC, Mar. 2010.
Honeywell, "Total Connect User Guide," Revision B, 34 pages, May 15, 2012. K14741.
Honeywell, "VisionPRO® 8000 Thermostats," Homeywell International Inc., 2 pages, Downloaded May 24, 2012. http://yourhome.honeywell.com.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://hunter-thermostats.com/hunter_programmable_thermostats.html, Hunter Thermostat 44668 Specifications, and 44758 Specifications, 2 pages, Printed Jul. 13, 2011.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Model 44758 Remote Sensor," Owner's Manual, 2 pages, Revision Sep. 4, 2008. Form No. 44044-01.
Hunter, "Auto Saver 550", Owner's Manual Model 44550, 44 pages, prior to Jul. 7, 2004.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Larsson, "Battery Supervision in Telephone Exchanges," Ericsson Components AB Sweden, 5 pages, Downloaded May 5, 2012. 9.14.
Lennox, "Network Control Panel (NCP)," User's Manual, 18 pages, Nov. 1999.
Lennox, "Prodigy Control System," Lennox Industries, 4 pages, May 25, 2012. (63W21)-01/11.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mounting Template for Ritetemp Thermostat 8082, 1 page, 2002.
Omron Electronic Components, LLC, "Micro Tilt Sensor D6B," Cat. No. JB301-E3-01, 6 pages, Mar. 2005.
Omron Electronic Components, LLC, "Micro Tilt Sensor D6B," Cat. No. B02WAD1, 2 pages, Jun. 2002.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.

(56) References Cited

OTHER PUBLICATIONS

Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276. Revised Jul. 20, 2008.
Screenshot of http://lagotek.com/index.html?currentSection=TouchIt, Lagotek, 1 page, prior to Mar. 29, 2012.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
SmartAC, "Thermostat Programming Web Site Guide," PG-WC-7E, 2 pages, 2009.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trane, "Wireless Zone Sensor. Where Will Wireless Technology Take You?," 4 pages, Feb. 2006.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.

* cited by examiner

SYSTEMS AND METHODS FOR ASSOCIATING WIRELESS DEVICES OF AN HVAC SYSTEM

TECHNICAL FIELD

This disclosure relates generally to HVAC systems, and more particularly, to systems and methods for associating wireless devices of an HVAC system.

BACKGROUND

Heating, ventilation, and/or air conditioning (HVAC) systems are often used to control the comfort level within a building or other structure. HVAC systems typically include an HVAC controller that controls various HVAC components of the HVAC system in order to affect and/or control one or more environmental conditions within the building. Some HVAC system use wireless communication between some devices. For example, in some cases, a central control device, such as a thermostat or zone control panel, may be in wireless communication via a wireless building control network with one or more perimeter devices, such as one or more sensors and/or actuators. Installation, commissioning and/or troubleshooting of such HVAC systems can be difficult and time consuming.

SUMMARY

This disclosure relates generally to HVAC systems, and more particularly, to systems and methods for associating wireless devices of an HVAC system on a wireless building control network. In some cases, an HVAC system may include one or more central devices that communicate with one or more perimeter devices via a wireless building control network. Central devices may be, for example, building controllers, thermostats, zone control panels, or any other suitable device. Perimeter devices may include, for example, sensors, actuators, HVAC components, etc. It is often not desirable to have more than one defined central device on a wireless building control network. However, in many HVAC systems, such as a zoned HVAC system, there will be two or more thermostats, each capable of operating as the central control device of the wireless building control network. In this example, the installer must properly setup both thermostats, and associate the various perimeters devices of the HVAC system. Configuring the various devices to properly associate and then communicate can be difficult and time consuming, particularly for HVAC installers that are not well versed in computer networking technology. This can result in improper configurations in the field, increased service calls, and/or increased support.

In one example, a building control network may have a first central device, a second central device and one or more peripheral devices. An illustrative method may include placing the second central device into an associate mode. With the second central device in the associate mode, an associate command may be sent from a perimeter device to associate the perimeter device with the second central device. The associate command may be received by the first central device. The first central device may send one or more commands to the second central device, where the one or more commands may cause the second central device to be taken out of its associate mode and to reconfigure the second central device to a perimeter device. The first central device may then be put in an associate mode, and both the second central device and the perimeter device may be associated as perimeter devices with the first central device. Using this approach, it may appear to the installer that he is associating a perimeter device (e.g. basement temperature sensor) with a second central device (e.g. basement thermostat), but behind the scenes, both the perimeter device (e.g. basement temperature sensor) and the second central device (e.g. basement thermostat) may be associated as perimeter devices with the first central device (e.g. an upstairs thermostat).

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which.

Figure 1:
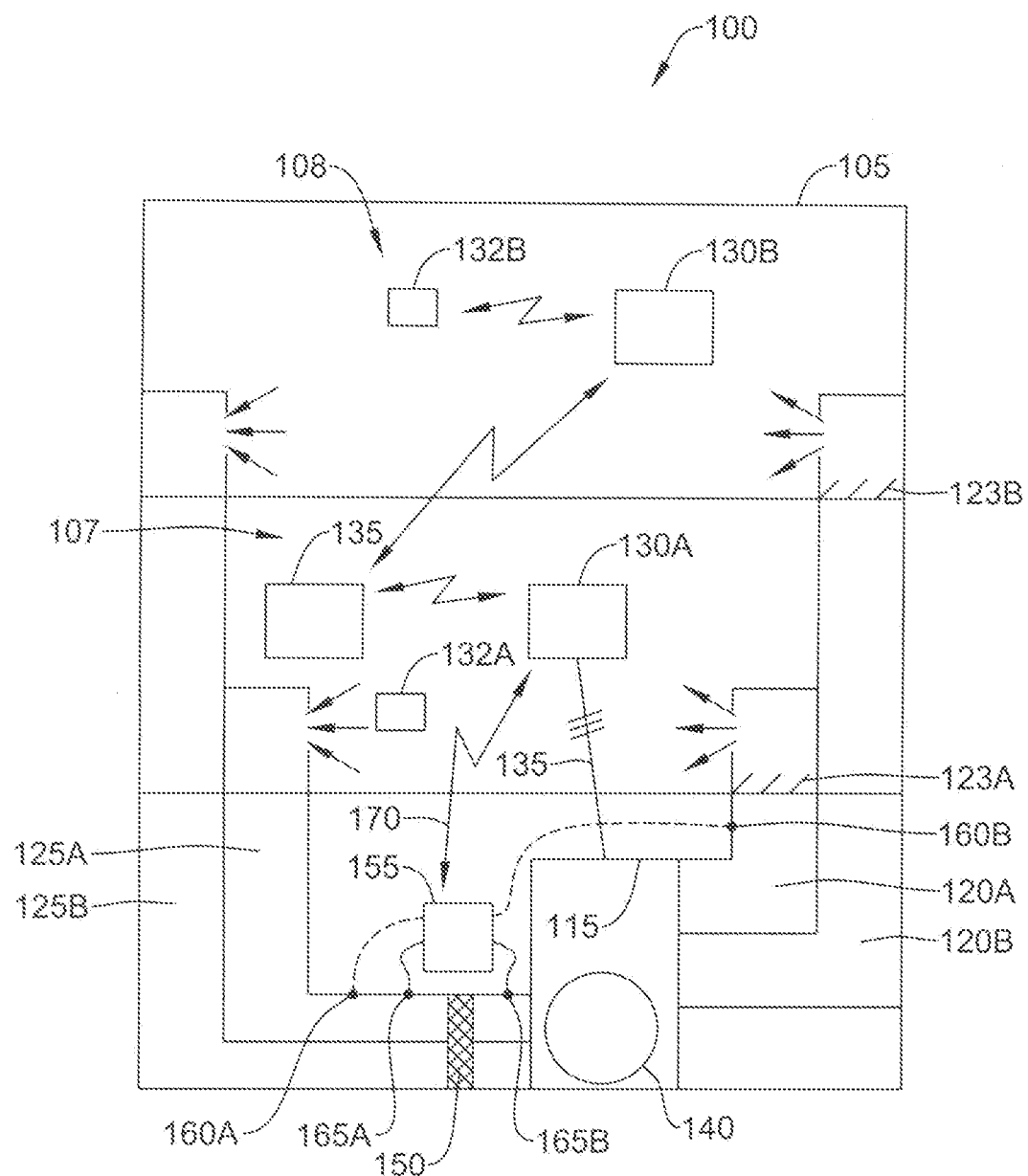
FIG. 1 is a is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

In building communication networks, such as wireless communication networks within one or more buildings, installers may configure associations of devices to exchange communications with other devices that may be within range. In some systems (e.g., radio frequency (RF) systems), two basic types of devices may be used: a central device and multiple perimeter devices which may be associated with the central device. It is believed that installers may quickly become accustomed to a particular type of device that is commonly considered the central device (e.g., a building controller, a zone controller, a thermostat, etc.), and which are the perimeter devices (e.g., a sensor, an actuator, an HVAC component, etc.). Confusion may occur when another device commonly thought of as a central device is added to a building communication network that already includes a defined central device. In such cases, the second central device may need to be reconfigured as a perimeter device, and associated with the first central device of the building control network. The first central device may then manage communication between the second central device and one or more perimeter devices. Although it may be technically possible to provide an interface for the installer to configure a device as central device or a perimeter device, it is believed that it may be difficult for an installer to understand the requirements of configuring such a building control network.

This problem may be reduced by, for example, having an installer place a second central device (e.g. basement thermostat) into an associate mode. With the second central device in the associate mode, an associate command may be sent from a perimeter device (sometimes initiated by pressing a button or the like on the perimeter device) to associate the perimeter device with the second central device. The associate command may be received by the first central device (e.g. upstairs thermostat). The first central device (e.g. upstairs thermostat) may send one or more commands to the second central device (e.g. basement thermostat), where the one or more commands may cause the second central device (e.g. basement thermostat) to be taken out of its associate mode and to reconfigure the second central device (e.g. basement thermostat) as a perimeter device. The first central device (e.g. upstairs thermostat) may then be put in an associate mode, and both the second central device (e.g. basement thermostat) and the perimeter device may be associated as perimeter devices with the first central device (e.g. upstairs thermostat).

To an installer, it may appear as if an association was made between the perimeter device and the second central device (e.g. basement thermostat). However, the first central device (e.g. upstairs thermostat), the second central device (e.g. basement thermostat) and the perimeter device may form an associated group, where the first central device (e.g. upstairs thermostat) can route information as needed between its associated devices (e.g. between the perimeter device and the second central device). The installation process may be more intuitive for the installer because it may not require an understanding of perimeter and central device configuration requirements.

FIG. 1 is a schematic view of an illustrative HVAC system 100 servicing a building or structure 105. While not required, in an illustrative embodiment, the building 105 may include one or more zones 107, 108 and may have an illustrative heating, ventilation, and air conditioning (HVAC) system 115 configured to service the one or more zones 107,108. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 100 of FIG. 1 may include one or more HVAC components 115, a system of ductwork and air vents including one or more supply air ducts 120A, 120B and one or more return air ducts 125A, 125B, and one or more central devices, such as HVAC controllers 130A, 130B. The one or more HVAC components 115 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, an actuator and/or the like.

It is contemplated that the HVAC controller(s) 130A, 130B may be configured to control the comfort level in the building or structure by activating and deactivating the HVAC component(s) 115 in a controlled manner. The HVAC controller(s) 130A, 130B may be configured to control the HVAC component(s) 115 via a wired or wireless communication link 135. In some cases, the HVAC controller(s) 130A, 130B may be a thermostat, such as, for example, a wall mountable thermostat, but this is not required. Such a thermostat may include (e.g. within the thermostat housing) or have access to a temperature sensor for sensing an ambient temperature at or near the thermostat. In some instances, the HVAC controller(s) 130A, 130B may be a zone controller, or may include multiple zone controllers each monitoring and/or controlling the comfort level within a particular zone 107, 108 in the building or other structure.

In some embodiments, one or more perimeter devices, such as sensors 132A, 132B may be included in the building 105. The perimeter devices 132A, 132B may be configured to communicate with the central devices 130A, 130B via a wired or wireless communication link, such as link 135. Perimeter devices 132A, 132B may include one or more of a temperature sensor, a humidity sensor, or an air quality sensor (e.g., a $CO_2$ sensor, a contaminant sensor, etc.), an actuator, or any other suitable device or component as desired. In some instances, a sensor 132A may be provided to measure environmental parameters or air quality parameters. In some instances, environmental parameters of interest may include relative humidity, dew point temperature, absolute humidity, wet bulb temperature, enthalpy, etc. For example, sensor 132A may be provided to measure the relative humidity of zone 107 of building 105, and sensor 132B may be provided to measure temperature of zone 108 of building 105. In some instances, a contaminant sensor can include a sensor for detecting certain potentially harmful or irritating chemical, biological or radiological composition elements or properties of the air within the building 105. For example, the sensors may be used to detect carbon monoxide (CO), particulates of various sizes, smoke, aerosols, Total Volatile Organic Compounds (TVOCs) such as formaldehyde, NO, NOX, SOX, SO2, H2S2, chlorine, nitrous oxide, methane, hydrocarbons, ammonia, refrigerant gases, radon, ozone, radiation, biological and/or chemical terrorist agents, other toxic gases, mold, other biologicals, and other contaminants of interest.

An illustrative HVAC controller, which is not meant to be limiting in any way, is disclosed in, for example: U.S. patent application Ser. No. 13/325,525 filed on Dec. 14, 2011, entitled "HVAC CONTROLLER WITH HVAC SYSTEM FAULT DETECTION"; U.S. Published Patent Application No. 20090140062, entitled "HVAC CONTROLLER THAT SELECTIVELY REPLACES OPERATING INFORMATION ON A DISPLAY WITH SYSTEM STATUS INFORMATION"; U.S. Published Application No. 20090143880, entitled "HVAC CONTROLLER WITH CONTEXT SENSITIVE HELP SCREENS"; U.S. Published Application No. 20090143918, entitled "METHOD AND APPARATUS FOR CONFIGURING AN HVAC CONTROLLER"; U.S. Published Application No. 20090143916, entitled "HVAC CONTROLLER HAVING A PARAMETER ADJUSTMENT ELEMENT WITH A QUALITATIVE INDICATOR"; U.S. Published Application No. 20090143879, entitled "HVAC CONTROLLER WITH PARAMETER CLUSTERING"; U.S. Published Application No. 20090140056, entitled "HVAC CONTROLLER WITH QUICK SELECT FEATURE," the entireties of which are incorporated herein by reference for all purposes.

In the illustrative HVAC system 100 shown in FIG. 1, the HVAC component(s) 115 may provide heated air (and/or cooled air) via the ductwork throughout the building 105. As illustrated, the HVAC component(s) 6 may be in fluid communication with every room and/or zone 107, 108 in the building 105 via the ductwork 120A, 120B, 125A, and 125B, but this is not required. In operation, when a heat call signal is provided by the HVAC controller(s) 130A, 130B, an HVAC component 115 (e.g. forced warm air furnace) may be activated to supply heated air to one or more rooms and/or zones 107, 108 within the building 105 via supply air ducts 120A, 120B. The heated air may be forced through supply air duct 120A, 120B by a blower or fan 140. In this example, the cooler air from each zone may be returned to the HVAC component 115 (e.g. forced warm air furnace) for heating via return air ducts 125A, 125B. Similarly, when a cool call signal is provided by the HVAC controller(s) 130A, 130B, an HVAC component 115 (e.g. air conditioning unit) may be activated to supply cooled air to one or more rooms and/or zones 107, 108 within the building or other structure via supply air ducts 120A, 120B. The cooled air may be forced through supply air ducts 120A, 102B by the blower or fan 140. In this example, the warmer air from each zone may be returned to the HVAC component 115 (e.g. air conditioning unit) for cooling via return air ducts 125A, 125B. In some cases, the HVAC system 100 may include an internet gateway or other device 135 that may allow one or more of the HVAC components 115, as described herein, to communicate over the internet or other wide area network (WAN).

In some cases, the system of vents or ductwork 120A, 120B and/or 125A, 125B can include one or more dampers 123 to regulate the flow of air, but this is not required. For example, one or more dampers 123A, 123B may be coupled to one or more HVAC controller(s) 130A, 130B, and can be coordinated with the operation of one or more HVAC components 115. The one or more HVAC controller(s) 130A, 130B may actuate dampers 123A, 123B to an open position, a closed position, and/or a partially open position to modulate the flow of air from the one or more HVAC components 115 to an appropriate room and/or zone in the building or other structure. The dampers 123A, 123B may be particularly useful in zoned HVAC systems, and may be used to control which zone(s) 107, 108 receive conditioned air from the HVAC component(s) 115. In some cases, the dampers 123A, 123B may include an actuator.

In many instances, one or more air filters 150 may be used to remove dust and other pollutants from the air inside the building 105. In the illustrative example shown in FIG. 1, the air filter(s) 150 is installed in the return air duct 125A, and 125B, and may filter the air prior to the air entering the HVAC component 115, but it is contemplated that any other suitable location for the air filter(s) 150 may be used. The presence of the air filter(s) 150 may not only improve the indoor air quality, but may also protect the HVAC components 115 from dust and other particulate matter that would otherwise be permitted to enter the HVAC component 115.

In some cases, and as shown in FIG. 1, the illustrative HVAC system 100 may include an equipment interface module (EIM) 155. When provided, the equipment interface module 155 may be configured to measure or detect a change in a given parameter between the return air side and the discharge air side of the HVAC system 100. For example, the equipment interface module 155 may be adapted to measure a difference in temperature, flow rate, pressure, or a combination of any one of these parameters between the return air side and the discharge air side of the HVAC system 100. In some cases, the equipment interface module 155 may be adapted to measure the difference or change in temperature (delta T) between a return air side and discharge air side of the HVAC system 100 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

In some cases, the equipment interface module 155 may include a first temperature sensor 160A located in the return (incoming) air duct 125A, and a second temperature sensor 160B located in the discharge (outgoing or supply) air duct 120A. Alternatively, or in addition, the equipment interface module 155 may include a differential pressure sensor including a first pressure tap 165A located in the return (incoming) air duct 125A, and a second pressure tap 165B located downstream of the air filter 150 to measure a change in a parameter related to the amount of flow restriction through at least a portion of the air filter 150. In some cases, the equipment interface module 155, when provided, may include at least one flow sensor that is capable of providing a measure that is related to the amount of air flow restriction through the air filter 150. In some cases, the equipment interface module 155 may include an air filter monitor. These are just some examples.

If provided, the equipment interface module 155 may be configured to communicate with one or more of the HVAC controller 130A, 130B via, for example, a wired or wireless communication link 170. In other cases, the equipment interface module 155 may be incorporated or combined with one or more of the HVAC controller 130A, 130B. In either case, the equipment interface module 155 may communicate, relay or otherwise transmit data regarding the selected parameter (e.g. temperature, pressure, flow rate, etc.) to the HVAC controller 130A, 130B. In some cases, the HVAC controller 130A, 130B may use the data from the equipment interface module 155 to evaluate the system's operation and/or performance. For example, the HVAC controller 130A, 130B may compare data related to the difference in temperature (delta T) between the return air side and the discharge air side of the HVAC system 100 to a previously determined delta T limit stored in the HVAC controller 130A, 130B to determine a current operating performance of the HVAC system 100.

Figure 2:
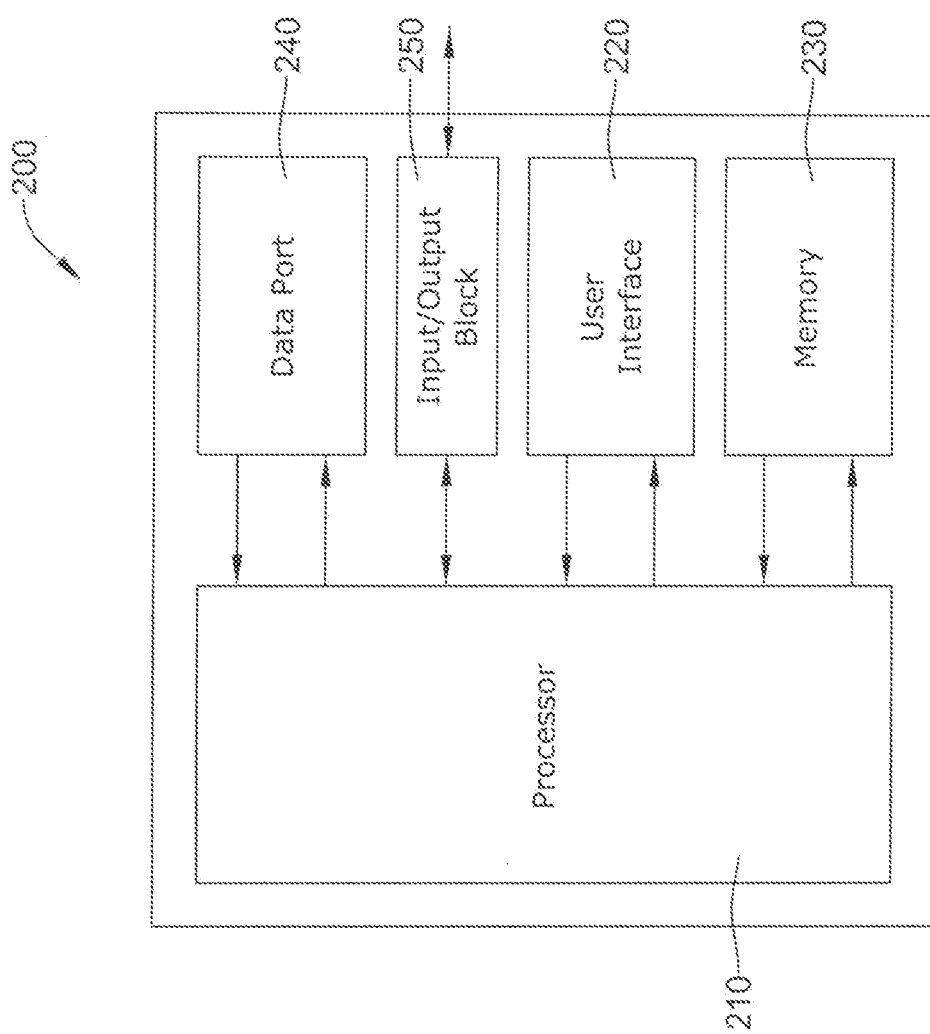
FIG. 2 is a schematic view of an illustrative HVAC controller that may be configured as a central device.

FIG. 2 is a schematic view of an illustrative HVAC system device 200, such as the HVAC controller 130A, 130B, or the perimeter device 132A, 132B. In some instances, the HVAC system device 200 may be a thermostat or a zone controller, but this is not required. In the illustrative embodiment of FIG. 2, the HVAC system device 200 includes a processor (e.g. microprocessor, microcontroller, etc.) 210, a user interface 220, and a memory 230. In some cases, the device 200 may optionally include an input/output block (I/O block) 250 for receiving one or more signals from the HVAC system and/or for providing one or more control signals to the HVAC system 100. The I/O block 250 may communicate with one or more HVAC components 115 of the HVAC system 100. Alternatively, or in addition to, the I/O block 250 may communicate with another controller (e.g., 130A, 130B, etc.), which is in communication with one or more HVAC components 115 of the HVAC system 100, such as a zone panel in a zoned HVAC system.

The processor 210 may operate in accordance with an algorithm that controls or at least partially controls one or more HVAC components 115 of an HVAC system such as, for example, HVAC system 100 shown in FIG. 1. The processor 210 may, for example, operate in accordance with an algorithm that provides temperature set points, starting and/or ending times, and the like. In an example, the processor 210 may be configured to operate the algorithm using an operating system, such as an example embedded operating system embedded operating system (e.g., QNX, NiagaraAX, etc.). In some cases, HVAC system device 200 may include a timer (not shown). The timer may be integral to the processor 210 or may be provided as a separate component.

In the illustrative embodiment of FIG. 2, user interface 220 may be any suitable use interface that permits HVAC controller 200 to display and/or solicit information, as well as accept one or more user interactions with the HVAC system device 200. For example, the user interface 220 may permit a user to enter data such as temperature set points, humidity set points, starting times, ending times, diagnostic limits, conditions under which diagnostic limits may be suspended, responses to alerts, and the like. In some cases, user interface 220 may include a display and a distinct keypad. A display may be any suitable display. In some instances, a display may include or may be a liquid crystal display (LCD), and in some cases a fixed segment display or a dot matrix LCD display. If desired, user interface 220 may be a touch screen LCD panel that functions as both display and keypad. In some instances, a touch screen LCD panel may be adapted to solicit values for a number of operating parameters and/or to receive such values, but this is not required.

The memory 230 of the illustrative HVAC system device 200 may be in communication with the processor 210. Memory 230 may be used to store any desired information, such as the aforementioned control algorithm, set points, schedule times, diagnostic limits such as, for example, differential pressure limits, delta T limits, and the like. Memory 230 may be any suitable type of storage device including, but not limited to, RAM, ROM, EPROM, flash memory, a hard drive, and/or the like. In some cases, processor 210 may store information within memory 230, and may subsequently retrieve the stored information.

In some cases, the processor 210 may be programmed to monitor one or more signals received from the HVAC system, either directly or via the I/O block 250, to determine whether or not the HVAC system has violated a predetermined diagnostic limit for a selected parameter stored in the controller memory 230. In some cases, for example, the processor 210 may monitor the signals from the HVAC system 100 to determine whether or not the HVAC system 100 has violated a predetermined delta T limit for either the heating and/or cooling mode. A violation of a predetermined diagnostic limit such as, for example a delta T limit, may occur if the HVAC system fails to reach a minimum delta T limit or exceeds a maximum delta T limit. In some cases, a violation may occur, for example, if the HVAC system fails to meet or exceed a minimum delta T limit within a predetermined period of time. These are just some examples. The diagnostic limits and the conditions for violating a diagnostic limit can be dependent upon the HVAC system set-up, the number and type of HVAC components 115 included in the HVAC system, whether or not the HVAC system is subject to a utility load shutoff, user preference, user specified conditions for determining a diagnostic fault, and/or the like.

In many cases, when a diagnostic limit has been violated, the processor 210 may be configured to indicate to the user that a diagnostic fault has occurred. This may be accomplished in any of a variety of ways. For example, if the processor 210 has determined that a diagnostic limit has been violated, and a diagnostic fault has occurred, the processor 210 may display a user alert on the display of the user interface 220 of the HVAC system device 200. In some cases, the processor 210 may be programmed to alert the user to a diagnostic fault only after a predetermined number of faults are detected by the processor 210. In some cases, the user alert may be a simple text string displayed on the display of the user interface 220 describing the nature of the violation that has occurred. In other instances, the processor 210 may provide some visual indication to alert the user that a fault has occurred. Such visual indication may include a colored, flashing, highlighted, or grayed-out button or icon provided on the user interface 220. In still other instances, the processor 210 may be configured to send an email, instant message, text message or some other message to a user to alert the user that a fault has occurred via an internet gateway or other device (e.g. internet gateway 135 of FIG. 1) that is adapted to communicate over the internet or other wide area network. Such an alert may be provided to the user even when the user is away from the home, building, or other structure in which the HVAC system is located.

In some instances, as will be described in greater detail herein, the processor 210 may also be programmed to query a user via the user interface 220 for one or more conditions that specify when a user is not to be alerted to a detected fault of the HVAC system. The user may specify one or more conditions for when the HVAC system device 200 is not to alert a user to a detected fault for each heating and/or cooling stage of the HVAC system, as desired. For example, the user may specify that the user is not to be alerted to a diagnostic fault when the diagnostic fault occurs during a utility shutoff period or a defrost cycle. Regardless of whether or not indication of a fault is provided to a user, the processor 210 may be programmed to record the fault in a faults log stored in the memory 230 associated with the processor 210. An illustrative log is shown and described in co-pending U.S. application Ser. No. 13/227,395, entitled, "HVAC Controller Including User Interaction Log," filed on Sep. 7, 2011, which is incorporated herein by reference in its entirety and for all purposes.

In some cases, as illustrated in FIG. 2, HVAC system device 200 may include a data port 240. Data port 240 may be a wireless port such as a Bluetooth™, or any other wireless protocol. In other cases, data port 240 may be a wired port such as a serial port, an ARCNET port, a parallel port, a CAT5 port, a USB (universal serial bus) port, and/or the like. In some cases, Data port 240 may use one or more communication protocols, such as Ethernet, BACNet, LONtalk, etc., that may be used via a wired network or a wireless network. In some instances, data port 240 may be a USB port and may be used to download and/or upload information from a USB flash drive or some other data source. Other remote devices may also be employed, as desired.

Data port 240 may be configured to communicate with processor 210 and may, if desired, be used to upload information to processor 210 and/or download information from processor 210. Information that can be uploaded and/or downloaded may include, for example, values of operating parameters. In some instances, data port 240 may be used to upload a previously-created thermostat configuration into HVAC system device 200, thereby hastening the programming process. In some cases, data port 240 may be used to download a thermostat configuration that has been created using HVAC system device 200, so that the thermostat configuration may be transferred to other similar thermostats, hastening their programming process. In some cases, data port 240 may be used to upload and/or download information pertaining to an HVAC dealer or contractor, if desired.

In some cases, data port 240 may be used to download data stored within the memory 230 for analysis. For example, data port 240 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XML, and/or Adobe PDF® file, but this is certainly not required.

Figure 3:
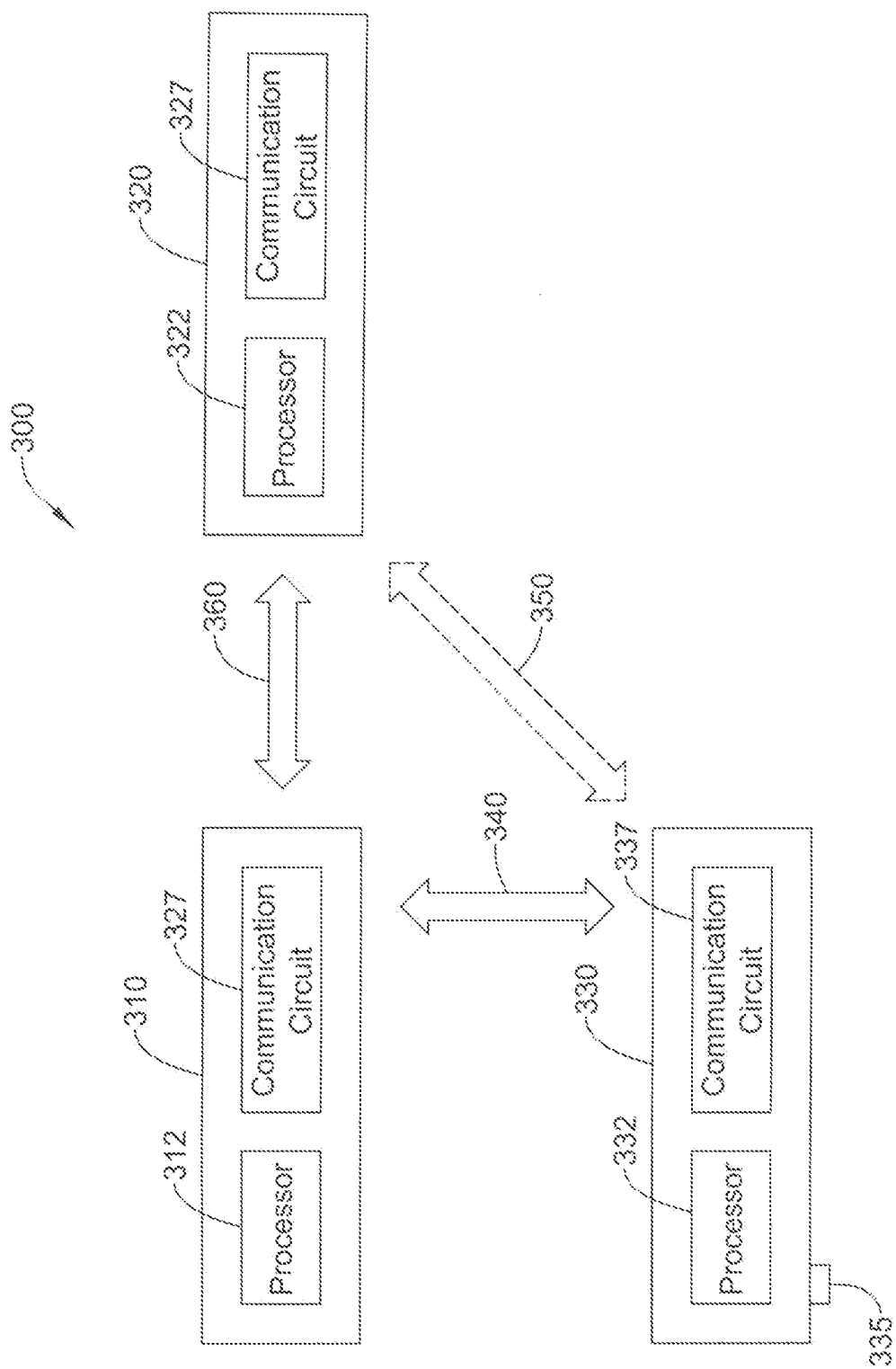
FIG. 3 is an illustrative example of communication between a first central device, a second central device and a perimeter device.

FIG. 3 is an illustrative example of communication between a first central device, a second central device and a perimeter device. While only two central devices 310 and 320 and one perimeter device 330 are shown, it is contemplated that more than two central device and/or more than two perimeter devices may be used.

In some instances, a building control network 300 may include one or more central devices, such as a first central device 310, and a second central device 320 and one or more perimeter devices, such as perimeter device 330. In an example, the building control network of FIG. 1 may include a first central device (e.g., the building controller 130A), a second central device (e.g., the building controller 130B) and one or more perimeter devices (e.g., one or more of the sensors 132A, 132B, the equipment interface module 155, the HVAC component 115, etc.). In the example building control network 300, each of the first central device 310, the second central device 320, and perimeter device 330 may respectively include a processor 312, 322, 332 (e.g., processor 210) and a communication circuit 317, 327, 337. In some instances, the first central device 310, the second central device 320 and the perimeter device 330 may be configured to communicate via a wireless communication link, such as communication links 340, 350 and 360.

In the example shown in FIG. 3, the first central device 310 and the perimeter device 330 may become associated by placing the first central device 310 into an 'associate' mode. The associate mode may allow the first central device 310 to poll or otherwise monitor a communication network for perimeter devices which are also in the associate mode. The first central device 310 may be placed in the associate mode by, for example, using a mechanical method (e.g., a switch, a button, etc.) or by using a user interface (e.g., a button on a touch screen display). An installer may initiate an associate mode on the perimeter device 330, which causes the perimeter device 330 to broadcast a command or message over a communication network, such as the communication link 340, to any central device in the associate mode. The perimeter device 330 may be placed in the associate mode using a mechanical method (e.g., a switch 335, a button, etc.) or using a user interface (e.g., a button on a touch screen display). The first central device 310, being in the associate mode, may receive the command or message from the perimeter device 330, and may place the perimeter device 330 onto a list of associated devices stored in its memory (e.g., memory 230). The first central device 310 may send a response (e.g. acknowledgement) to the perimeter device 330 via the communication link 340, indicating that the perimeter device 330 is now associated with the first central device 310, and the perimeter device 330 may save the association in its memory. The associate mode of the perimeter device 330 and/or the first central device 310 may then be canceled, sometimes manually by a user, to return each to an operation mode. In some cases, the associate mode of the perimeter device 330 or the first central device 310 may be changed to an operation mode automatically following a successful association.

In some instances, an installer or other user may wish to add a second central device 320 to the HVAC system, and associate a perimeter device 330 (or another perimeter device) with the second central device 320 rather than with the first control device. In some cases, this may be done in lieu of associating the perimeter device 330 with the first control device 310 as described above. To the installer, the association between the second central device 320 and the perimeter device 330 may be performed similar to that described to associate the first central device 310 and the perimeter device 330. However, the association between the second central device 320 and the perimeter device may not be direct, but rather may be made via the existing first central device 310. In one example, the second central device 320 and the perimeter device 330 may each be placed into an 'associate' mode. The second central device 320 may be placed in the associate mode by, for example, using a mechanical method (e.g., a switch, a button, etc.) or by using a user interface (e.g., a button on a touch screen display). The perimeter device 330 may be placed in the associate mode using a mechanical method (e.g., a switch 335, a button, etc.) or using a user interface (e.g., a button on a touch screen display).

Upon seeing another central device in the associate mode, the first central device 310 may broadcast or send a message via the communication network, such as communication link 360, to the one or more other central devices that are in the associate mode to change from the associate mode to a 'perimeter device' mode. A central device in 'perimeter device' mode may appear to a user of the building control network to communicate directly to its associated perimeter devices, such as via communication link 350, however communication between the perimeter device mode central device and one or more perimeter devices may in fact be routed via another central device (e.g. the first central device 310).

In some cases, after issuing the message to one or more other central devices to change from associate mode to perimeter mode, the first central device 310 may change to its associate mode. In some cases, the first central device 310 may already be in an associate mode. Once the first central device 310 is in the associate mode, the first central device 310 may associate the second central device 320 as a perimeter device. The first central device 310 may associates both the second central device 320 and the perimeter device 330 as perimeter devices associated with the first central device 310. To a user, communication between the second central device 320 and the perimeter device 330 may appear to use the communication link 350. However, communication between the second central device 320 and the perimeter device 330 may actually use the communication link 360 between the second central device and the first central device 310, and then be routed by the first central device 310 to the perimeter device 330 using the communication link 340.

In some cases, the first central device 310 may associate the perimeter device 330 as a perimeter device of the second central device 320. In some cases, after making the association between the second central device 320 and the perimeter device 330, the second central device may add the perimeter device 330 to a list of associated devices. In some cases, the first central device 310 may add the second central device to the list of associated devices. Once the associations between the first central device 310, the second central device 320 and the perimeter device 330 are properly made, each of the first central device 310, the second central device 320 and perimeter device 330 may automatically (or manually) return to an operation mode. In some cases, one or more of the first central device 310, the second central device 320 and the perimeter device 330 may be manually changed from the associate mode to the operation mode.

Figure 4:
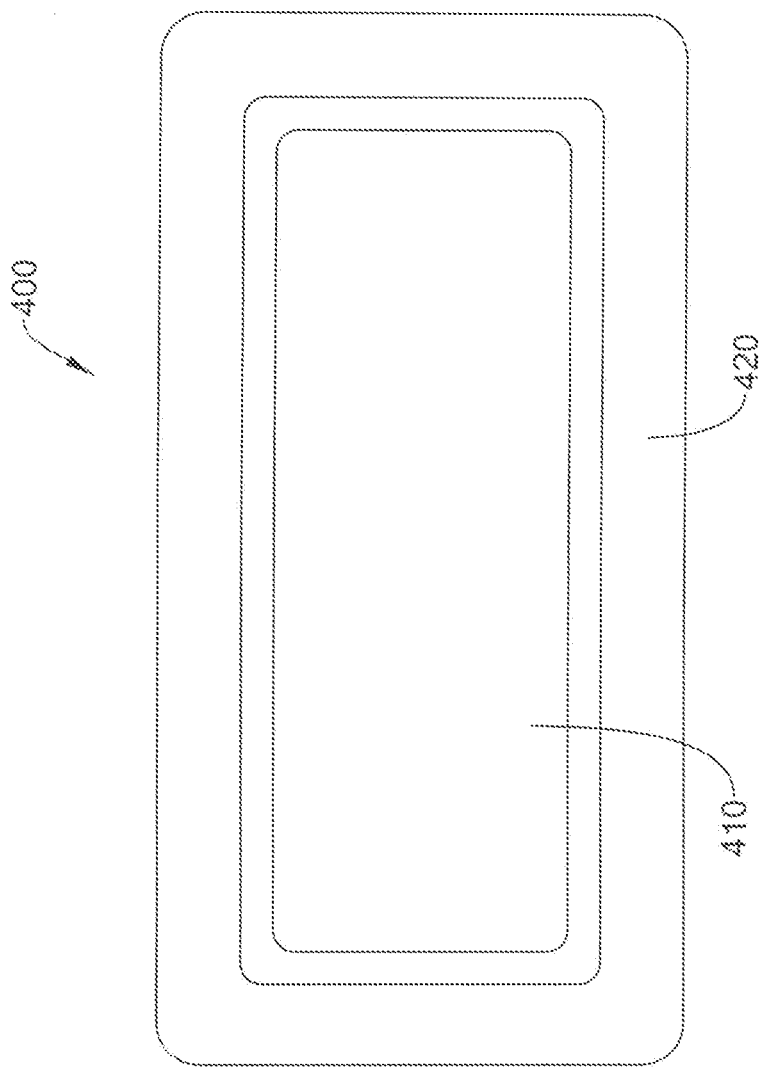
FIG. 4 is a front view of an illustrative HVAC controller.

FIG. 4 is a front view of an illustrative HVAC controller 400, such as HVAC controller 130A, 130B. In the illustrative embodiment of FIG. 4, HVAC controller 400 may include a display 410 that is disposed within a housing 420 but viewable externally from the housing 420. In some cases, display 410 may be a touch screen LCD display. If desired, display 410 may be a dot matrix touch screen LCD display. A dot matrix touch screen LCD display is a touch screen LCD that permits images such as letters, numbers, graphics, images, and the like to be displayed anywhere on the LCD, rather than being confined to predetermined locations such as is the case with a fixed segment type of LCD display. Housing 420 may be formed of any suitable material, such as a polymeric material. In some cases, the housing 420 may be formed such that it defines a data port 240 (see FIG. 2). The housing 420 may also include suitable wiring and/or other electrical connections such that the HVAC controller 400 may be electrically coupled to the HVAC system 100.

In some cases, HVAC controller 400 may be configured to provide substantial display and/or programming functionality. In some cases, HVAC controller 400 may be configured to display a default display, referred to herein as a home screen, which is displayed by HVAC controller 400 when no other data entry is underway for a period of time. In some cases, one or more home screens may be displayed by HVAC controller 400. In some cases, the home screens may include screens that can be accessed by a top level navigational menu. A home screen may, if desired, display one or more parameters relating to environmental conditions such as indoor and/or outdoor air temperature and/or humidity, expected weather conditions, and/or the status of equipment that is at least partially controlled by HVAC controller 400. In some instances, a home screen may display a user alert that may indicate that the system is not operating properly or that a routine maintenance such as, for example, a filter change, is desirable, but this is not required.

FIGS. 5-8 provide several example screens that may be displayed upon the HVAC controllers of FIGS. 2-4 when an installer is performing setup operations of the HVAC system 100. In some instances, an installer may use the illustrative screens to configure communication between a single central device and one or more perimeter devices. In some instances, the installer may use the illustrative screens to configure communication between two or more central devices and one or more perimeter devices, such as illustrated in FIGS. 1 and 3.

Figure 5:
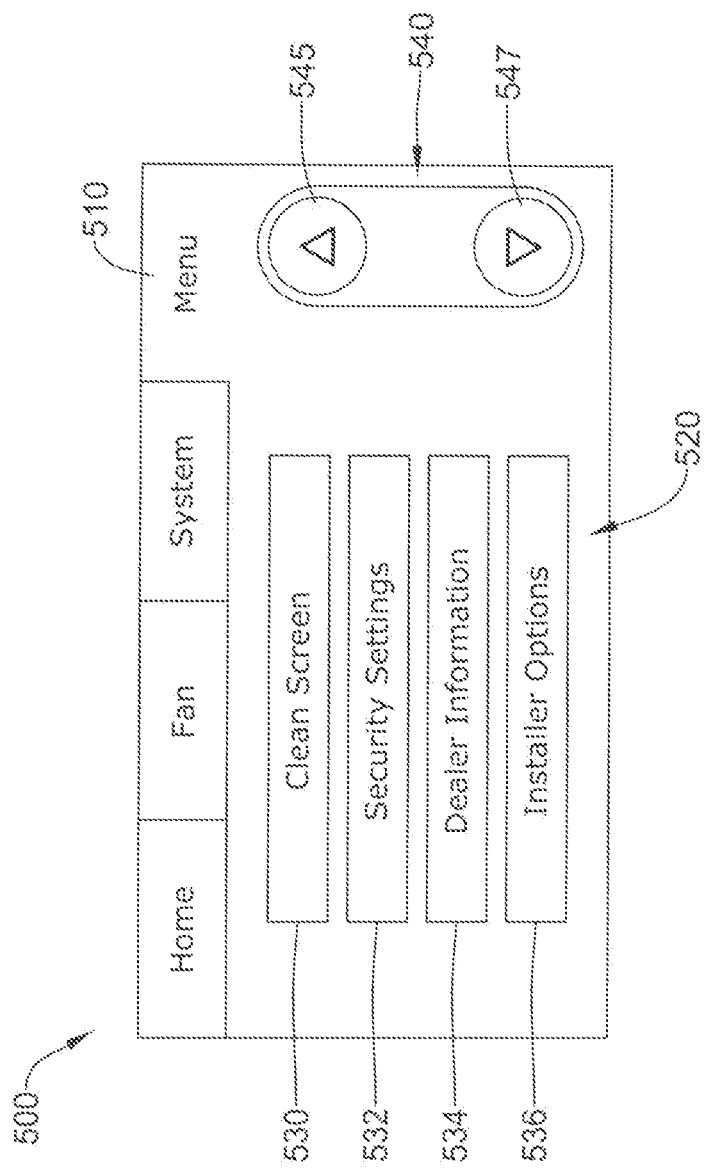
FIGS. 5-8 provide several illustrative examples of screens that may be displayed upon the HVAC controllers of FIGS. 2-4 when in use.

FIG. 5 shows an example menu screen 500 that may be displayed when a user selects the MENU tab 510 on home screen, such as a home screen of a thermostat or zone controller, such as the HVAC controller(s) 130A, 130B of FIG. 1. The illustrative menu screen 500 may include a table 520 that includes one or more selectable menu options 530-536 that may be selected by the user. In some cases, the table 520 may be a scrolling table, in which case the menu screen 500 may also include a scroll bar 540 including first and second arrows 545, 547 that may facilitate a user in scrolling through the available menu options 530-536.

Figure 6:
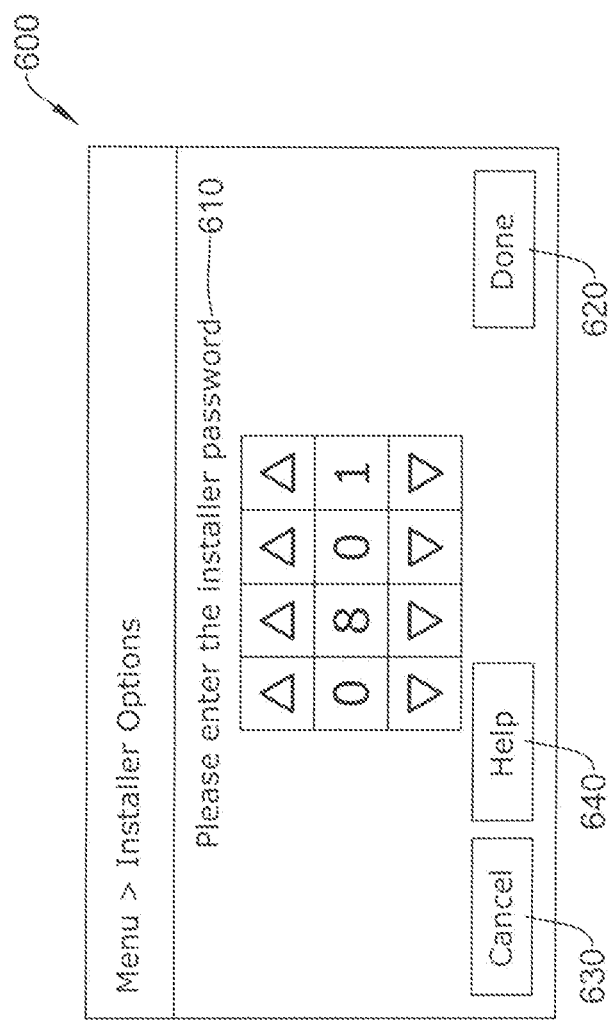

Upon selection of the INSTALLER OPTIONS menu option 536, the illustrative HVAC controller 130A, 130B may be configured to display a password prompt screen 600, such as illustrated in FIG. 6. The password prompt screen 600 may include a user prompt 610 that may prompt the user to enter a user login ID, which may include a user name and/or password. In some cases, certain rights may be associated with different user login IDs or passwords. For example, a homeowner may have a different login ID, with different associated rights than an HVAC contractor. The user login ID and/or password may include any combination of alphanumeric characters in the example shown. In one example, as illustrated in FIG. 6, the password may be a sequence of numbers. The sequence of numbers may be adjusted to the correct sequence by using the corresponding arrow keys. When properly set, the user may select the DONE button 620 to confirm entry of the user login ID. In some cases, the password prompt screen 600 may include a CANCEL button 630 which, upon its selection, may cancel the user's current actions and return the user to the previous screen, such as the menu screen 500 of FIG. 5. In some cases, the password prompt screen 600 may include a HELP button 640. Selection of the HELP button 640 may cause the HVAC controller 130A, 130B to display additional information about the currently displayed screen, such as information on how to use the password prompt screen 600. Sometimes this information screen may appear on an additional screen or a pop-up screen that overlays the current screen, but this is not required.

Figure 7:
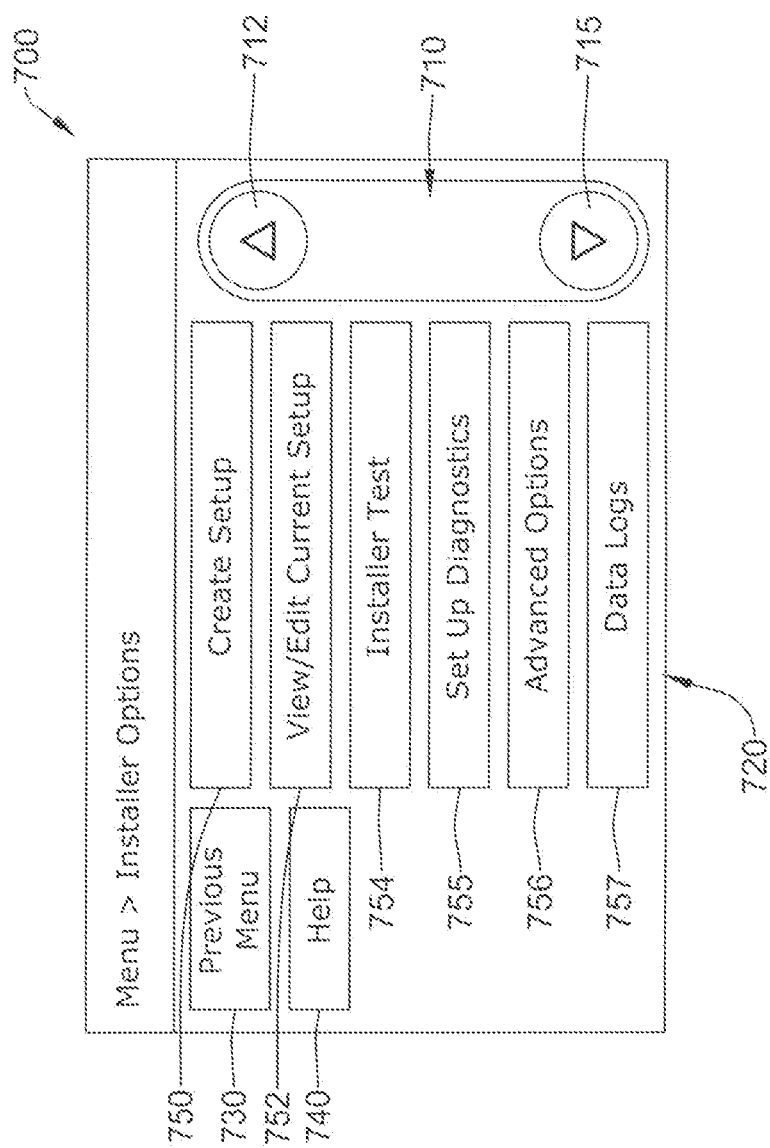

Upon selection of the DONE button 620 confirming entry of a password, the HVAC controller 130A, 130B may confirm that a valid password has been entered. If a valid password has been entered, the HVAC controller 130A, 130B may display an installer options menu screen 700, such as illustrated in FIG. 7. Like the previous menu screen 500, the installer options menu screen 700 may include a table 620 including one or more installer options. In some cases, the table 620 may be a scrolling table, in which case the installer options menu screen 700 may also include a scroll bar 710 having first and second arrows 712, 715 that may facilitate a user to scroll through and view the available installer options presented in table 720. The installer options menu screen 700 may also include a BACK button or PREVIOUS MENU button 730 which, when selected, may cause menu screen 500 of FIG. 5 to be displayed. Additionally, in some cases, the installer options menu screen 700 may include a HELP button 740, which when selected, may cause additional information pertaining to the currently displayed screen to be displayed, such as information on how to use the installer options menu screen 700.

In many cases, the table 720 may include one or more installer options 750-757 that may be selected by the user. In some cases, a CREATE SETUP installer option 750 may be provided, which may provide access to a series of successive installer set-up screens that may query the user to specify one or more setup parameters relating to the system setup for the particular HVAC system 100. Selection of this option may be appropriate when, for example, the user is initially setting up the HVAC system prior to operation. In some instances, the series of successive screens may query the user regarding parameters related to HVAC systems and their setup including, but not limited to the following: the type of HVAC system (e.g. zoned or non-zoned), the type of heating system (e.g. conventional forced, air, heat pump, radiant heat, to name a few), the type of heating equipment (e.g. standard efficiency gas forced air, high efficiency gas forced air, electric forced air, etc.), the number of equipment stages for each of the cooling system and heating system, the temperature ranges (e.g. minimum and maximum set points) for both heating and cooling, what sensors are included in the HVAC system (e.g. indoor air temperature, outdoor air temperature, return air temperature sensor, discharge air temperature sensor, etc.), the number of air filters, whether not the HVAC system includes a humidifier, the type of humidifier (if applicable), whether or not the HVAC system includes a dehumidifier, ventilation, the number and type of UV devices (if applicable), among others. These are just some examples. In some instances, the HVAC controller 130A, 130B may be configured to automatically detect the various components 115 of the HVAC system and parameters indicative of the system setup. Still, in other instances, the user may also view and/or edit the current setup by selecting the VIEW/EDIT CURRENT SETUP menu option 752 which may facilitate the user in viewing and/or making changes to previously entered and/or detected setup parameters.

Figure 8:
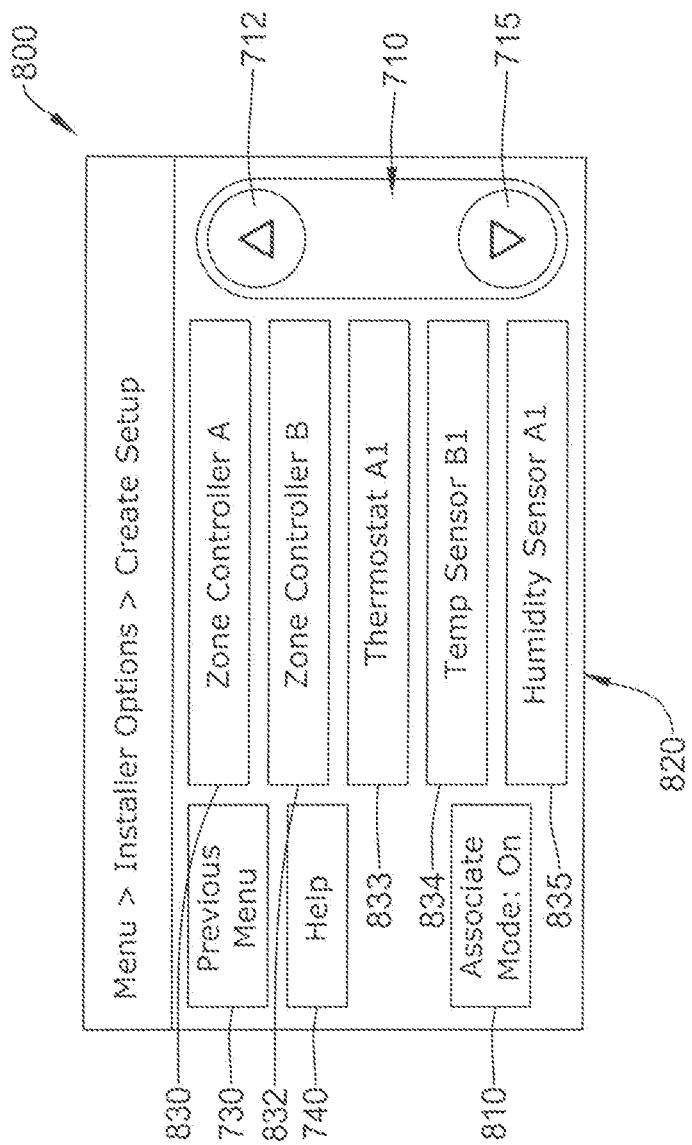

In some cases, after selection of the CREATE SETUP button 750, the HVAC controller 130A, 130B may display an HVAC system setup menu screen 800, such as illustrated in FIG. 8. In some cases, the HVAC system setup menu screen 800 may be viewed following a selection of another button of the installer options menu screen 700, such as the VIEW/EDIT CURRENT SETUP menu option 752. In any event, like the previous menu screen 700, the HVAC system setup menu screen 800 may include a table 820 including one or more available devices for use within the HVAC system. In some cases, the devices 830-835 may be automatically detected, such as by using a wireless building control network. In other cases, the devices 830-835 may appear on the HVAC system setup menu screen 800 after being entered into the table 820 by an installer.

In some instances, the table 820 may include one or more central devices (e.g., zone controller A 830, zone controller B 832, or thermostat A1) and one or more perimeter devices (e.g., temperature sensor B1 834 or Humidity Sensor A1 835). In one embodiment, the table 820 may include the devices associated with the device having the screen 800. For example, the HVAC system setup menu screen 800 may correspond to a first central device, such as the first central device 310 of FIG. 3, where the table 820 includes the perimeter devices 833-835 associated with that particular central device. In some cases, the table 820 may be a scrolling table in which the HVAC system setup screen may also include a scroll bar 710 having first and second arrows 712, 715 that may facilitate a user in scrolling through and viewing the available devices presented in table 820.

In some cases, the HVAC system setup menu screen 800 may include one or more central devices. A central device may be configured as a perimeter device by an installer, such as thermostat A1 833. In one example, the HVAC system setup menu screen 800 may be associated with a screen of a particular central device such that the table 820 may include perimeter devices associated with that particular central device. For example, the HVAC system setup menu screen 800 may be associated with a zone controller (e.g., zone controller A 830), such that the table 820 includes the central device 830 and one or more perimeter devices associated with the central device 830, such as the thermostat A1 833 and the humidity sensor A1 835. In another example, the HVAC system setup menu screen 800 may be associated with a screen of a particular central device, and the table 820 may include one or more central devices of the building control system, such as the zone controller A 830 and the zone controller B 832, and one or more perimeter devices, such as the thermostat A1 833, the temperature sensor B1 834, or the humidity sensor B1 835. The table 820 may include an indication of an association between a central device (e.g., the zone controller A 830) and one or more perimeter devices (e.g., the thermostat A1 833, the humidity sensor A1 835). In some cases, the table 820 may include two or more central devices and their associated perimeter devices. For example, the zone controller A 830 may be associated with the thermostat A1 832 and the humidity sensor A1 835, and the zone controller B 831 may be associated with the temperature sensor B2 834.

In some instances, one or more perimeter devices may be associated with two (or more) central devices, such as first central device 310 and second central device 320, as described above with FIG. 3. For example, the temperature sensor B1 834 may be associated with both the zone controller A 830 and the zone controller B 831.

In some cases, the HVAC system setup menu screen 800 may include an indication of the current mode of the device, such as via a mode indicator 810. In the example shown, the mode indicator 810 may be a button used by an installer to place the device with the screen 800 into the associate mode, such as by manually pressing the button/indicator 810. In other cases, the device with the screen 800 may be placed into associate mode by an installer using a separate switch or button, such that indicator 810 may merely indicate whether the device is currently in associate mode or in an operation mode.

Figure 9:
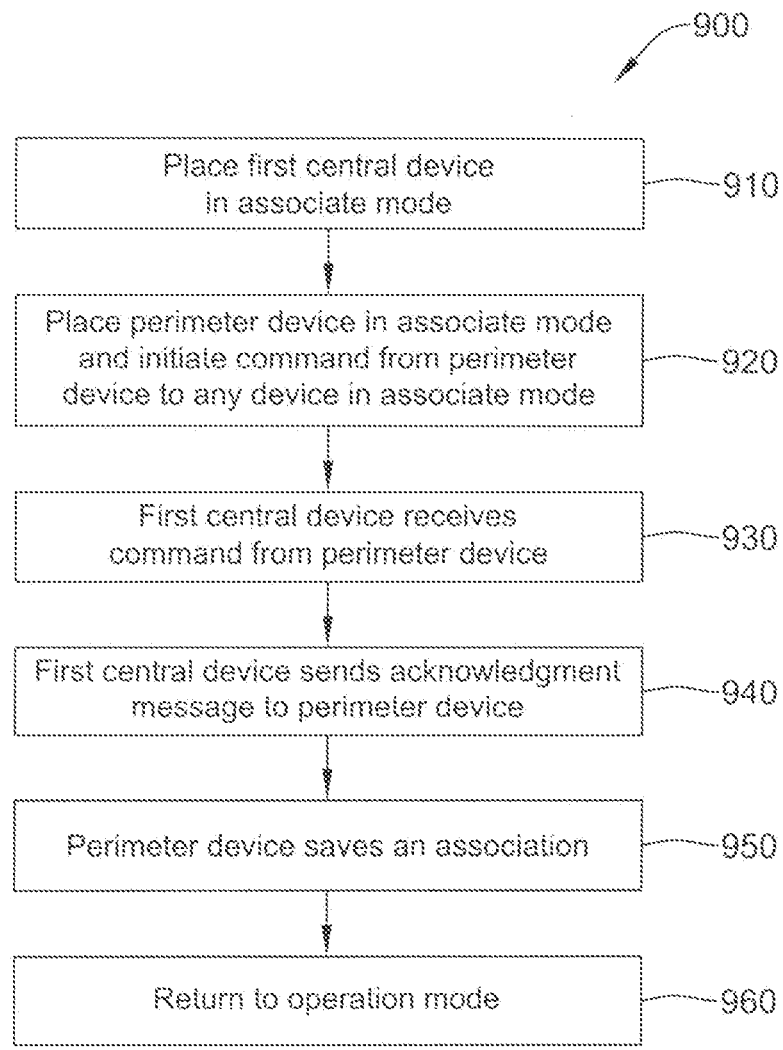
FIG. 9 provides a flow chart of an illustrative technique to associate a first central device to a perimeter device.

FIG. 9 provides a flow chart of an illustrative method 900 for associating a first central device to a perimeter device. At 910, a central device, such as first central device 310, may be placed in an associate mode. As discussed above with FIG. 3, a user may place the first central device in the associate mode manually using a switch, button or other mechanical method. In some instances, the user may use a user interface, such as by using a button 810 on the HVAC system setup menu screen 800 of FIG. 8.

At 920, with the first central device in the associate mode, a user may cause a perimeter device to send a message to a central device, such as a command or message being broadcast from the perimeter device to the first central device to associate the perimeter device with the first central device. In some cases, this is done by having the installer activate a button or the like on the perimeter device to cause it to enter an associate mode, which subsequently sends the command or message. In some cases, the command or message sent by the perimeter device may be sent to an individual central device, or may be broadcast and received by any central device that is in its associate mode. In one example, an installer may place a perimeter device 330 into its associate mode using a switch, which may cause the perimeter device 330 to broadcast a command or message to the central devices (e.g., the first central device 310, and/or the second central device 320) within the building control system, which is received and processed by the one or more central devices that are in the associate mode.

At 930, a central device in the associate mode receives the command or message from perimeter device. In one example, the first central device 310 may receive the message from the perimeter device via the communication link 340. If the perimeter device 330 is not currently on the first central device's 310 list of associated devices, the first central device may add the perimeter device 330 to its list of associated devices (e.g., table 820). The association of the perimeter devices may be stored within the memory 230 of the central device (see, FIG. 2). At 940, before or after adding the perimeter device to its list of associated devices, the central device may send an acknowledgement message to the associated perimeter device, where the acknowledgement message may indicate the result of the association command. For example, the first central device 310 may indicate that association between the perimeter device and the central device was successful. At 950, the perimeter device may save an indication that the perimeter device is associated with the central device. This step may be optional. In some cases, the perimeter device may save the association to a memory, such as memory 230 of the perimeter device (see, FIG. 2). At 960, the central device and perimeter device may be taken out of their association modes. In some cases, a user may manually change the mode of the central device and/or perimeter device from the associate mode to the operation mode. In other cases, the central device and/or perimeter device may automatically change from the associate mode to the operation mode following a successful association.

Figure 10:
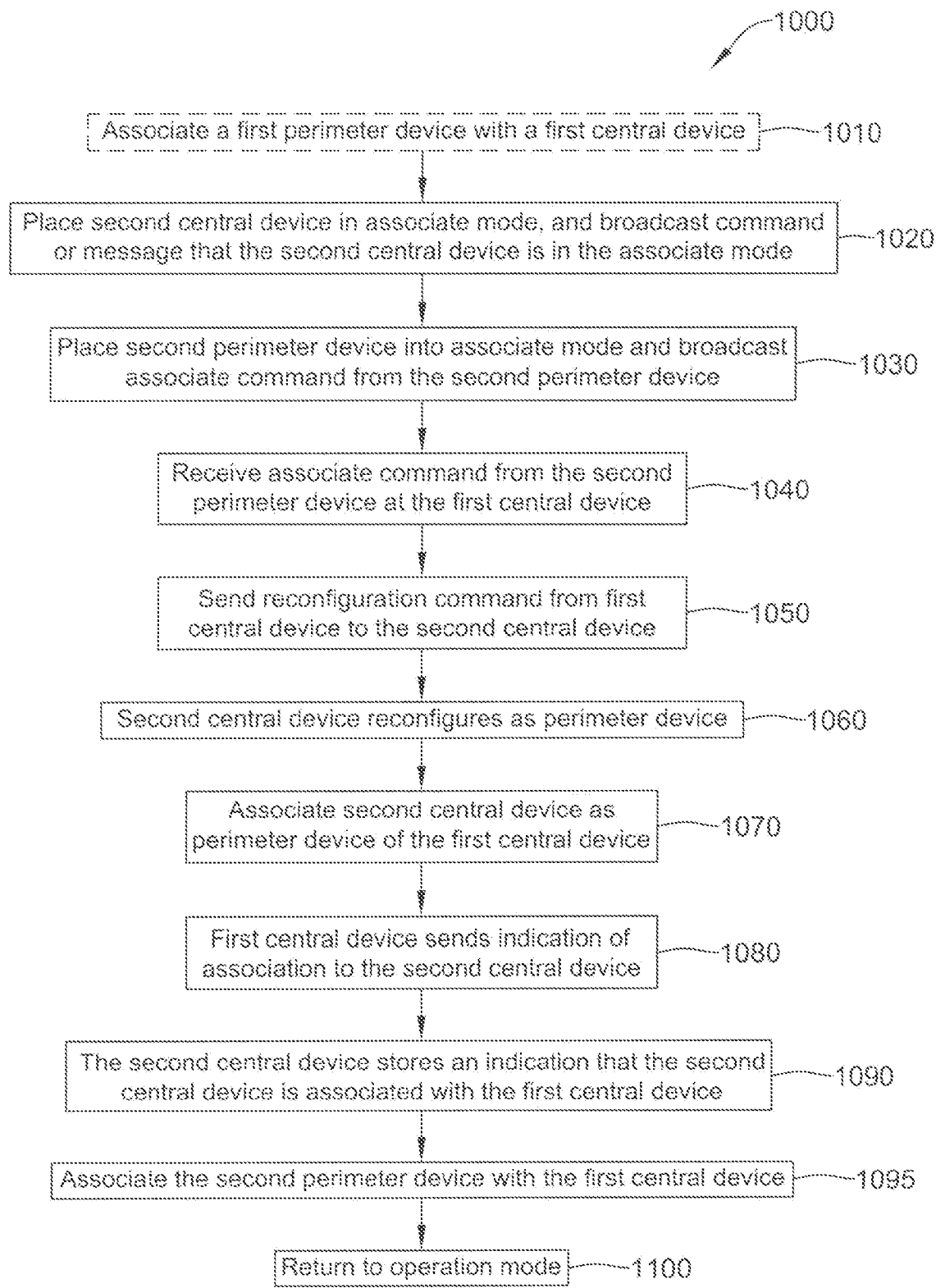
FIG. 10 provides a flow chart of an illustrative technique to associate a perimeter device to a second central device, wherein the perimeter device is associated to a first central device.

FIG. 10 provides a flow chart 1000 of an illustrative method to associate a perimeter device to a second central device, when a first central device is already present in the building control network. At 1010, a user may associate a first perimeter device with a first central device, such as by using the method 900 of FIG. 9. This step 1010 is optional in the method of FIG. 10. At 1020, a user may place a second central device into an associate mode, which may broadcast a command or message that the second central device is in its associate mode. At 1030, a user may place a second perimeter device into its associate mode. In this example, a user may desire to associate the second perimeter device to the second central device. The second perimeter device may broadcast a command or message that the second perimeter device is in its associate mode.

At 1040, the first central device may receive the command or message sent by the second central device and in some cases the second perimeter device. In response, and at 1050, the first central device may broadcast a command or message to the second central device, commanding the second central devices to reconfigure itself as a perimeter device (enter a perimeter device mode). The first central device may enter its associate mode. At 1060, the second central device reconfigures itself as a perimeter device (enter a perimeter device mode). The second central device may automatically terminate the associate mode as part of the procedure to reconfigure itself as a perimeter device. In some cases, the second central device may broadcast a message including an associate command to any devices in associate mode, such as the first central device. At 1070, the first central device may receive the associate message or command from the second central device and add the second central device to its list of associated devices. At 1080, the first central device may send a message to the second central device, where the message may indicate the result of the association command. For example, the first central device 310 may indicate that association between the second central device 320 and the first central device 310 was successful. At 1090, the second central device may save an indication that the first central device is associated with the second central device (now in the perimeter mode). For example, the second central device may save the association indication to a memory, such as memory 230 of FIG. 2.

At 1095, if the second perimeter device is not currently on the first central device's list of associated devices, the first central device may add the second perimeter device to its list of associated devices (e.g., table 820). In some cases, the desired association of the user between the second perimeter device and the second central device (now operating in a perimeter device mode) may also be noted and stored. The first central device may then subsequently route messages between the second central device (now operating in a perimeter device mode) and the second perimeter device, such as by using the communication links 340 and 360 (e.g., see FIG. 3). The list of associated perimeter devices may be visible to a user, such as by a screen 800, or may be stored internally and hidden from the user. At 1100, the first central device and/or the second perimeter device may return to an operation mode.

In some cases, a central device of a building control network may be provided. The central device may include a wireless interface for sending and receiving one or more commands to/from one or more perimeter devices and another central device. The one or more perimeter devices may each be configured to send out an associate command when instructed to by a user, and the another central device may have an associate mode for associating one or more perimeter devices with the another central device. The central device may also include a controller coupled to the wireless interface. The controller may have an associate mode, wherein once in the associate mode, the controller may be programmed to receive one or more associate commands from one or more perimeter devices, and once received, add the corresponding one or more perimeter devices to an associated device list. In some cases, after one or more perimeter devices have been added to the associated device list, and when the controller is not in the associate mode, the controller may be programmed to receive one or more additional associate commands from one or more additional perimeter devices, and in response, the controller may be configured to place itself into the associate mode, send out one or more instructions to the another central device to take the another central device out of its associate mode and to reconfigure the another central device as another perimeter device, add the another perimeter device to the associated device list of the controller such that the another perimeter device becomes associated with the controller, and add the one or more additional perimeter devices to the associated device list of the controller.

In some cases, an HVAC controller may be provided. The HVAC controller may include a wireless interface for sending and receiving one or more commands to/from one or more perimeter devices and a separate central device. The one or more perimeter devices may each be configured to send out an associate command when instructed to by a user. Also, the separate central device may have an associate mode for associating one or more perimeter devices with the separate central device. The HVAC controller may also include a controller coupled to the wireless interface. The controller may be programmed to receive one or more associate commands from one or more perimeter devices, and in response, the controller may place itself into the associate mode, send out one or more instructions to the separate central device to take the separate central device out of its associate mode and to reconfigure the separate central device as another perimeter device, add the separate central device to an associated device list of the controller such that the separate central device becomes associated with the controller, and add the one or more perimeter devices that sent out the one or more associate commands to the associated device list of the controller. In some cases, the HVAC controller may be thermostat, a zone control panel, an equipment interface module, or any other suitable HVAC controller. In some cases, the separate central device may be a thermostat, a zone control panel, a equipment interface module, or any other suitable central device.

Having thus described several illustrative embodiments of the present disclosure, those of skill in the art will readily appreciate that yet other embodiments may be made and used within the scope of the claims hereto attached. It will be understood, however, that this disclosure is, in many respect, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A central device of a building control network, comprising:
    a wireless interface for sending and receiving one or more commands to/from one or more perimeter devices and another central device, the one or more perimeter devices each configured to send out an associate command when instructed to by a user, and the another central device having an associate mode for associating one or more perimeter devices with the another central device;
    a controller coupled to the wireless interface, the controller having an associate mode, wherein once in the associate mode, the controller is programmed to receive one or more associate commands from one or more perimeter devices, and once received, add the corresponding one or more perimeter devices to an associated device list; and
    wherein after one or more perimeter devices have been added to the associated device list, and when the controller is not in the associate mode, the controller is programmed to receive one or more additional associate commands from one or more additional perimeter devices, and in response, the controller is configured to place itself into the associate mode, send out one or more instructions to the another central device to take the another central device out of its associate mode and to reconfigure the another central device as another perimeter device, add the another perimeter device to the associated device list of the controller such that the another perimeter device becomes associated with the controller, and add the one or more additional perimeter devices to the associated device list of the controller.

2. The central device of claim 1, wherein the controller is further configured to send one or more commands that cause the perimeter devices that are listed in the associated device list to store an association with the central device.

3. The central device of claim 1, wherein the central device include a thermostat.

4. The central device of claim 1, wherein the central device includes a zone control panel.

5. The central device of claim 1, wherein the another central device includes a thermostat.

6. The central device of claim 1, wherein the central device includes an equipment interface module, wherein the equipment interface module includes one or more outputs for controlling one or more HVAC components of an HVAC system.

7. The central device of claim 6, wherein the other central device includes an equipment interface module, wherein the equipment interface module includes one or more outputs for controlling one or more HVAC components of an HVAC system.

8. The central device of claim 1, wherein one of the perimeter devices includes a thermostat.

9. The central device of claim 1, wherein one of the perimeter devices includes a temperature sensor.

10. The central device of claim 1, wherein one of the perimeter devices includes a humidity sensor.

11. The central device of claim 1, wherein one of the perimeter devices includes an equipment interface module, wherein the equipment interface module includes one or more outputs for controlling one or more HVAC components of an HVAC system.

12. A method for associating devices of a wireless building control network, the building control network having a first central device, a second central device and one or more peripheral devices, the method comprising:
    placing the second central device into an associate mode;
    with the second central device in the associate mode, sending an associate command from a perimeter device to associate the perimeter device with the second central device;
    receiving the associate command at the first central device;
    sending one or more commands from the first central device to the second central device, the one or more commands causing the second central device to be taken out of the associate mode and to reconfigure the second central device as a perimeter device;
    putting the first central device in an associate mode; and
    associating both the second central device and the perimeter device with the first central device as perimeter devices.

13. The method of claim 12, wherein the first central device receives the associate command from the perimeter device when the first central device is not in the associate mode.

14. The method of claim 12, wherein the second central device is manually placed into the associate mode by a user.

15. The method of claim 12, wherein a user manually initiates the perimeter device to send the associate command to associate the perimeter device with the second central device.

16. The method of claim 12, wherein the associate command is also received at the second central device.

17. An HVAC controller, comprising:
    a wireless interface for sending and receiving one or more commands to/from one or more perimeter devices and a separate central device, the one or more perimeter devices each configured to send out an associate command when instructed to by a user, and the separate central device having an associate mode for associating one or more perimeter devices with the separate central device;
    a controller coupled to the wireless interface, the controller is programmed to receive one or more associate commands from one or more perimeter devices, and in response, the controller is configured to places itself into the associate mode, send out one or more instructions to the separate central device to take the separate central device out of its associate mode and to reconfigure the separate central device as another perimeter device, add the separate central device to an associated device list of the controller such that the separate central device becomes associated with the controller, and add the one or more perimeter devices that sent out the one or more associate commands to the associated device list of the controller.

18. The HVAC controller of claim 17, wherein the HVAC controller is a thermostat.

19. The HVAC controller of claim 17, wherein the HVAC controller is an equipment interface module, wherein the equipment interface module includes one or more outputs for controlling one or more HVAC components of an HVAC system.

20. The HVAC controller of claim 17, wherein one or more of the perimeter devices can communicate with the separate central device through the HVAC controller.

* * * * *